United States Patent

[11] 3,626,485

| [72] | Inventor | Aubrey James Masters Holloway<br>Coventry, England |
|---|---|---|
| [21] | Appl. No. | 866,514 |
| [22] | Filed | Oct. 15, 1969 |
| [45] | Patented | Dec. 7, 1971 |
| [73] | Assignee | Dunlop Limited<br>Birmingham, England |
| [32] | Priority | Oct. 25, 1968 |
| [33] | | Great Britain |
| [31] | | 50,652/68 |

[54] SELF-ENERGIZING DISC BRAKES
10 Claims, 3 Drawing Figs.

[52] U.S. Cl. .................................................. 188/72.2
[51] Int. Cl. .................................................. F16d 55/46
[50] Field of Search .................................... 188/72.2

[56] References Cited
UNITED STATES PATENTS

| 3,392,809 | 7/1968 | Hodkinson et al. | 188/72.4 |
| 3,422,934 | 1/1969 | Hambling | 188/72.2 |

FOREIGN PATENTS

| 960,036 | 6/1964 | Great Britain | 188/72.2 |

Primary Examiner—George E. A. Halvosa
Attorney—Jeffers & Young

ABSTRACT: Single-sided disc brake comprising a brake disc, a pair of opposed friction pads, a rigid brake support structure, a rigid caliper extending across the brake disc and a brake-actuating mechanism mounted on one limb of the caliper. Complementary abutment surfaces inclined towards the disc, are formed on the support structure on both sides on the disc and on each friction element to render the brake self-energizing, once it has been applied. The friction elements are both mounted for limited movement with the disc relative to the caliper, whereby the caliper is subjected to little or no torque reaction when the brake is applied, of which the following is a specification.

SELF-ENERGIZING DISC BRAKES

This invention relates to disc brakes.

According to the invention a disc brake comprises a brake disc, a rigid support structure arranged to extend across a periphery of the brake disc, a rigid caliper mounted on the support structure for sliding movement in an axial direction with respect to the brake disc, a pair of friction elements mounted for engagement with opposite side faces of the disc and for limited movement relative to the caliper in a direction parallel to the side faces of the disc, a brake-actuating mechanism mounted on one limb of the caliper to exert a brake-applying thrust on one of the friction elements and to exert a corresponding brake-applying reaction thrust on the other friction element through the caliper, complementary inclined abutment surfaces being formed on the support structure on each side of the disc and on the friction elements whereby a self servo effect is set up by each friction element during application of the brake when the disc is rotating in its normal forward direction.

One embodiment of the invention will now be described by way of example with reference to the accompanying drawings in which.

Figure 1:
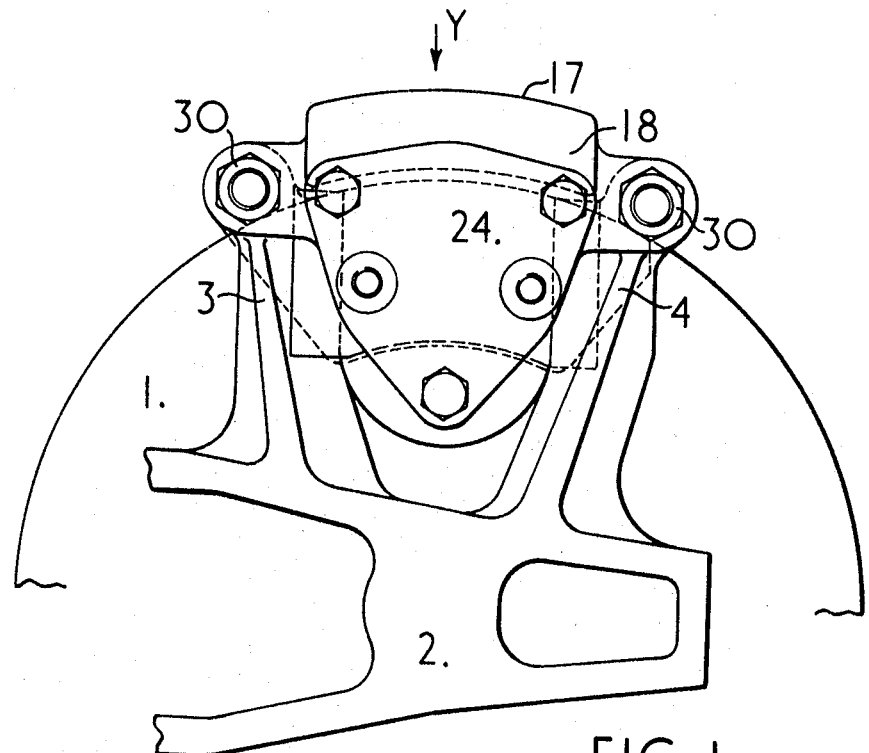
FIG. 1 is a side view of a disc brake according to the invention the view being in an axial direction with respect to the brake disc.
Figure 3:
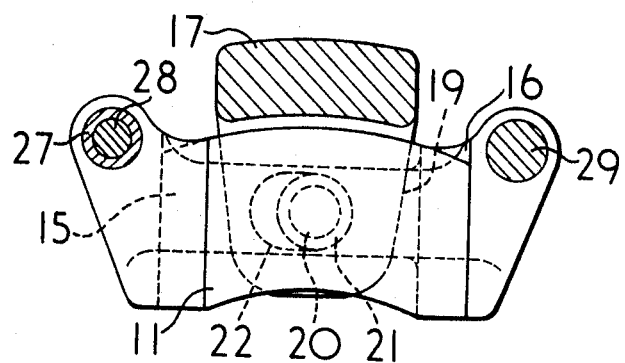
FIG. 3 is a cross-sectional view of the brake of FIGS. 1 and 2 on the line III—III in FIG. 2.

A disc brake for a front wheel assembly of a motor vehicle comprises a braking disc 1 fixed to the hub (not shown) of the wheel assembly (not shown) and rotatable therewith, and a nonrotatable supporting framework. The supporting framework comprises a support member 2 secured to the stub axle and formed with a pair of arms 3, 4 extending radially therefrom in a common plane parallel to the plane of the disc, the arms having at their ends, axially fixed anchoring-and-locating bosses 5, 6 respectively which project slightly beyond the outer periphery of the disc and extend axially relative thereto. The arms 3, 4 are angularly spaced-apart from one another are positioned on the inner side of the disc relative to the associated vehicle, and are spaced from the disc so that they do not obstruct the flow of cooling air to the disc when the vehicle is in motion. The bosses 5, 6 provide torque-taking elements located closely adjacent the side of the disc.

The arms 3, 4 carry torque-taking pins 7 of circular cross section rigidly secured one to each of the bosses 5, 6 the pins extending in an axial direction across the radially outer periphery of the disc 1. The axially outer ends of the pins are secured respectively to the ends of a rigid link member 8 positioned on the outer side of the disc relative to the associated vehicle and spanning the gap between the pins to improve the rigidity of the structure.

A pair of friction elements 9, 10 each comprising a friction pad 11 mounted on a metal backing plate 12 are arranged one on each side of the disc.

On the inner side of the disc each of the radially extending arms 3, 4, has an inclined abutment surface 13, 14 respectively formed on its side the abutment surfaces being parallel to one another and arranged to provide a guide for the associated inner friction element 9 to constrain the friction element to move in a direction which is inclined towards the plane of the disc 1 when the brake is applied during rotation of the disc in its normal forward direction as indicated by arrow A.

A pair of inclined abutment surfaces 15, 16 are also formed on the link member 8 for guiding the outer friction element 10 for movement in a direction which is inclined towards the plane of the disc 1 when the brake is applied during rotation of the disc in its normal forward direction.

The backing plates 12 each have corresponding inclined surfaces on their leading and trailing edges with respect to the normal direction of rotation of the disc, for sliding engagement with the corresponding abutment surfaces 13, 14 and 15, 16 respectively, the friction pads 12 being cut away slightly at their trailing edges so as to stand clear of the abutment surfaces.

A U-section rigid caliper 17 having axially inner and outer limbs 18,19 is positioned between the guide pins 7, its axially outer limb 19 being located with respect to the backing plate 12 of the axially outer friction element 10 by a spigot 20 secured to the limb and having an enlarged head 21 fitting into an elongated slot 22 formed in the backing plate so as to prevent movement of the friction element 10 in a radial direction with respect to the disc 1 while permitting limited movement of the friction element towards the abutment surface 16.

The inner limb 18 of the caliper carries a brake-applying mechanism in the form of a hydraulically operated piston 23 and cylinder 24, the piston being arranged to apply a thrust to the backing plate 12 of the friction element 9 in a direction perpendicular to the plane of the disc. A spigot 32 formed on the piston and located in an elongated slot formed in the backing plate 12 prevents movement of the friction element 9 in a radial direction with respect to the disc 1 while permitting limited movement of the friction element towards the abutment surface 14.

The caliper 17 is free to move in the axial direction as the brake is applied, movement of the caliper in a plane parallel to that of the disc 1 being restrained by the engagement of a pair of lugs 25 formed on the caliper with a pair of axial extensions 26 to the guide pins 7.

The leading guide pin 7 comprises a sleeve 27 clamped between the rigid link 8 and the boss 5 of the support member 2 by means of a bolt 28 passing through the sleeve. The trailing guide pin comprises a bolt 29.

Each bolt 28, 29 is threaded at each end and has an elongated cylindrical nut 30 on its axially inner end. The outer end of the leading bolt 28 with respect to the normal forward direction of rotation of the disc 1 engages a threaded bore in the link member 8 and the outer end of the trailing bolt 29 passes through a bore in the link member and is provided with a hexagonal nut 31.

The cylindrical nuts 30 constitute axial extensions to the guide pins and extend through bores formed in the lugs 25 on the capliper in sliding engagement with the lugs. Rubber bushes may be provided in the bores formed in the lugs for sliding engagement with the nuts 30.

The disc brake described above is operated by a conventional hydraulic system controlled by a master cylinder. The brake-applying mechanism forces the friction pad 11 of the friction element 9 into engagement with the disc 1, and the other friction pad 11 is then brought into engagement with the disc by axial movement of the caliper 17 under the reaction force set up by the brake-applying mechanism.

Figure 2:
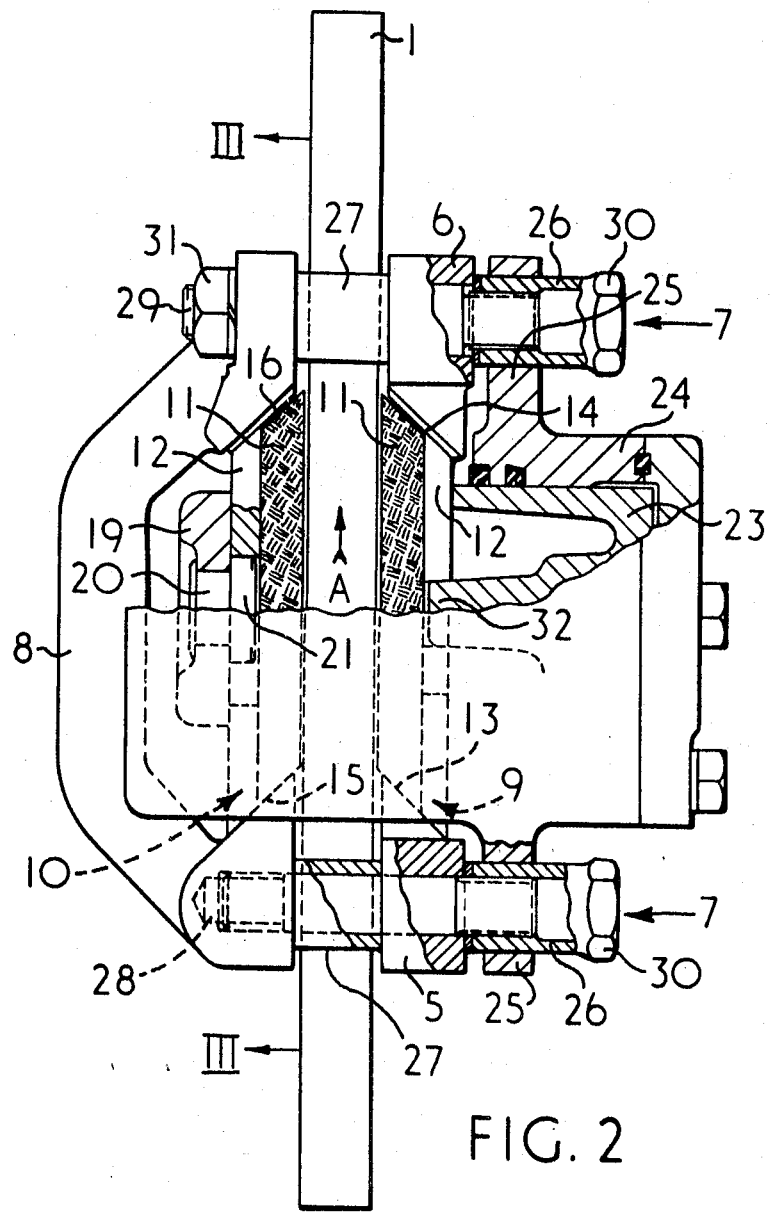
FIG. 2 is a view along the arrow Y of the brake of FIG. 1, the brake being shown partly sectioned

During rotation of the disc 1 in its normal forward direction, as indicated by the arrow A, on engagement with the disc each friction pad 9, 10 receives there from a thrust or drag transmitted thereto by virtue of the friction between the pad and the disc. Each pad and its backing plate are thus urged in the direction of arrow A in FIG. 2 against the respective inclined abutment surface 14 or 16.

Each abutment is chromium plated or otherwise treated to give it a hard surface having low friction characteristics. The backing plate of each friction element, being formed at its trailing end with an inclined surface complementary to its respective abutment surface receives from the abutment surface a reaction force having a component in a direction perpendicular to the plane of the respective side face of the disc. This reaction force supplements the brake-applying force exerted on the friction elements by the piston and cylinder assembly. In other words, the drag force exerted on each friction element by the disc causes the friction element to slide along its respective abutment surface towards the disc, and therefore as soon as the friction pad engages the disc, a self-servo effect is set up which adds considerably to the brake-applying thrust generated by the piston and cylinder assembly.

The construction of the brake described above enables the friction elements to be easily removed to replace worn friction pads by the following procedure.

The cylinder nut 30 of the bolt 28 of the leading guide pin and the nut on the outer end of the bolt of the trailing guide pin are removed. The link 8 is slid in an axial direction off the pin 29 and draws with it the bolt 28 and the brake caliper can now be swung on the trailing guide pin 29 clear of the disc so that the friction elements can be removed.

An important feature of the brake described above, is that the drag force or torque reaction generated when the brake is applied is transmitted to the brake support structure independently of the caliper 17. The inclined abutment surfaces on both sides of the disc against which the friction elements are forced are part of a rigid frame like structure constituting a rigid extension of the support member 2. This frame like structure takes the entire torque reaction and the only loads taken by the caliper are the brake-applying loads acting in a direction at right angles to the side faces of the disc and generated by the piston and cylinder assembly.

As indicated above, on account of the brake's self-servo properties, the thrust required to be generated by the piston and cylinder assembly is considerably less than that which is required in conventional nonself-servo brakes. Consequently, in the embodiment of the invention described above, the loads taken by the caliper are much lower than in conventional single-sided disc brakes and the caliper can be made of a light alloy material such as an aluminum alloy and this gives the brake the important advantage that it can be made very considerably lighter in weight than conventional brakes.

Having now described my invention what I claim is:

1. In a disc brake including a rotatable disc, the structure comprising a nonrotatable supporting framework comprising a substantially flat support member having two radially extending outwardly projecting limbs forming a notch therebetween disposed alongside said brake disc adjacent one of the radially extending side faces thereof, a pair of combination axially fixed anchoring-and-locating members one on each of said limbs which are angularly spaced apart and extending axially to provide torque-taking surfaces located along one side only of said disc and disposed closely adjacent thereto, a pair of friction elements having means providing slidable support relatively to said anchoring-and-locating members disposed one on each side of said disc to be engageable with opposite braking surfaces of said disc, both said friction elements consisting of an elongated friction liner and backing having inclined abutment surfaces forming slidable torque-taking remote ends adapted to operatively transmit anchoring thrust to complementary inclined abutment surfaces of said support member disposed at angularly spaced locations which are closely adjacent said disc and located adjacent said pair of combination anchoring-and-locting members, a rigid caliper carried at least in part directly by said anchoring-and-locating members and proportioned to be positioned between the said anchoring-and-locating members and having surfaces adapted to be complementary with said torque-taking surfaces and slidably supported thereby at one side of said rotatable disc, said caliper having a pair of limbs straddling the said periphery of the disc and carrying a friction element on each of said limbs, a brake-applying mechanism supported by one limb of said caliper and arranged to be operated to press the friction element associated therewith toward the disc and the other limb disposed in operative engagement with the other friction element to move it toward the disc under the reaction set up on the caliper by said brake-applying mechanism as said other limb is drawn toward said anchoring-and-locating members, said other friction element being disposed between said other limb and the associate side of said disc, said caliper being freely movable in an axial direction relative to said anchoring-and-locating members and positively located radially and circumferentially with respect to said friction elements.

2. The disc brake in accordance with claim 1 wherein said nonrotatable supporting framework is secured to a nonrotatable front wheel assembly of a motor vehicle and said rotatable disc is fixed to the hub of the wheel assembly and is rotatable therewith.

3. The disc brake in accordance with claim 1, wherein one of said friction elements is mechanically secured to its associated limb and has a lost motion connection to provide for circumferential shifting movement relative to said associated limb for transferring torque loads to said framework independently of said caliper.

4. In a disc brake, the combination comprising: a rotatable brake disc, a rigid support member on one side of said disc having a pair of radially extending spaced-apart arms projecting from the support member and proportioned to extend beyond the outer periphery of said disc, a pair of torque-taking members one secured to each of said arms and extending axially across the periphery of said brake disc, means joining said torque-taking members and disposed on the side of said disc oppositely to the side adjacent said support member, rigid caliper means slidably mounted at least in part directly on said torque-taking members for slidable movement in an axial direction relatively to said brake disc, a pair of friction elements carried by said rigid caliper means and located one on each of opposite sides of said disc and engageable with the confronting surfaces thereof and having limited circumferential movement relatively to said caliper in conjunction with said disc, brake-applying means having an axial mounting on one limb of said caliper to effect brake-applying thrust on a coacting one of said friction elements and adapted to develop corresponding brake-applying reaction thrust on the other of said friction elements through the side of the caliper coacting therewith, complememtary inclined abutment surfaces formed on said support members and the abutting surfaces of said friction elements to provide a wedging angle which effects self-servo, brake-applying force on each friction element as said friction elements move limitedly with the disc during normal forward rotational movement of said disc.

5. A disc brake, according to claim 4, wherein said brake-actuating mechanism develops applying force along a line substantially transversely to the friction element engaging surfaces of said disc.

6. A disc brake according to claim 4 wherein said rigid support member which includes a pair of torque-taking members and said pair of spaced-apart arms and said means joining the torque-taking members, constitute a rigid framelike structure for receiving the entire torque force substantially independently of said caliper.

7. A disc brake according to claim 4, wherein said torque-taking member includes bearing surfaces for receiving said caliper slidably thereon.

8. A disc brake according to claim 7 wherein said caliper slidably engages a portion of each said torque-taking member disposed remotely from said brake disc.

9. A disc brake according to claim 4, wherein said complementary inclined abutment surfaces form wedge angles at opposite ends of said friction elements providing self-energizing brake-application force derived from the wiping action between the respective one of said friction elements and the confronting surface of said disc and independently of said caliper means.

10. A disc brake according to claim 9, wherein said inclined abutment surfaces on each friction element are disposed to parallelism to each other.

* * * * *